United States Patent
Lin et al.

(10) Patent No.: US 9,241,342 B2
(45) Date of Patent: Jan. 19, 2016

(54) METHOD AND APPARATUS FOR ACK/NACK TRANSMISSION

(71) Applicant: CHINA ACADEMY OF TELECOMMUNICATIONS TECHNOLOGY, Beijing (CN)

(72) Inventors: Yanan Lin, Beijing (CN); Zukang Shen, Beijing (CN); Xuejuan Gao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 161 days.

(21) Appl. No.: 14/066,243

(22) Filed: Oct. 29, 2013

(65) Prior Publication Data
US 2014/0050176 A1    Feb. 20, 2014

Related U.S. Application Data

(63) Continuation of application No. PCT/CN2012/072944, filed on Mar. 23, 2012.

(30) Foreign Application Priority Data

Apr. 29, 2011    (CN) .......................... 2011 1 0110843

(51) Int. Cl.
*H04L 12/66*    (2006.01)
*H04W 4/00*    (2009.01)
(Continued)

(52) U.S. Cl.
CPC ........... *H04W 74/002* (2013.01); *H04L 1/1812* (2013.01); *H04L 1/1861* (2013.01); *H04W 72/02* (2013.01); *H04W 72/04* (2013.01)

(58) Field of Classification Search
CPC ... H04L 1/0027; H04L 1/1607; H04L 1/1854; H04L 1/1861
See application file for complete search history.

(56) References Cited

U.S. PATENT DOCUMENTS

2009/0323617 A1* 12/2009 Che et al. ...................... 370/329
2010/0111024 A1    5/2010 Fan et al.
(Continued)

FOREIGN PATENT DOCUMENTS

CN    101330306 A    12/2008
CN    101431774 A    5/2009
(Continued)

OTHER PUBLICATIONS

International Search Report for International Patent Application No. PCT/CN2012/072944, dated Jul. 5, 2012, and English translation thereof.
Japanese Office Action for Application No. 2014-506735 dated Sep. 22, 2014, and its English translation thereof.
Japanese Office Action for Application No. 2014-506735 dated Apr. 24, 2015, and its English translation thereof.
"Email Summary of A/N for TDD with PUCCH Format 1b with Channel Selection;" agenda item 6.2.1. 3GPP TSG RAN WG1 Meeting #63bis—document for discussion and decision. Dublin, Ireland, Jan. 17-21, 2011.
(Continued)

*Primary Examiner* — Melanie Jagannathan
(74) *Attorney, Agent, or Firm* — Harness, Dickey & Pierce, P.L.C.

(57) ABSTRACT

A method and an apparatus for ACK/NACK transmission. When a terminal device only receives a semi-persistent scheduling (SPS) physical downlink shared channel (PDSCH) and a physical downlink control channel (PDCCH) in which a downlink assignment index (DAI) value is equal to 1 in a feedback window, the terminal device transmits ACK/NACK feedback information corresponding to the SPS PDSCH and ACK/NACK feedback information corresponding to the PDCCH on PUCCH format 1a/1b resource using PUCCH format 1b with channel selection or ACK/NACK bundling.

20 Claims, 4 Drawing Sheets

(51) Int. Cl.
*H04W 74/00* (2009.01)
*H04L 1/18* (2006.01)
*H04W 72/02* (2009.01)
*H04W 72/04* (2009.01)

(56) References Cited

U.S. PATENT DOCUMENTS

| | | | |
|---|---|---|---|
| 2012/0087254 A1* | 4/2012 | Yin et al. | 370/252 |
| 2012/0294272 A1* | 11/2012 | Han et al. | 370/329 |
| 2012/0314674 A1* | 12/2012 | Seo et al. | 370/329 |

FOREIGN PATENT DOCUMENTS

| | | | |
|---|---|---|---|
| CN | 101588224 A | | 11/2009 |
| CN | 101882982 A | | 11/2010 |
| CN | 101989898 A | | 3/2011 |
| CN | 102142941 A | | 8/2011 |
| CN | 102170338 A | | 8/2011 |
| EP | 2204937 A1 | | 7/2010 |
| EP | 2234303 A1 | | 9/2010 |
| JP | 2012512582 A | | 5/2012 |
| JP | 2012517164 A | | 7/2012 |
| KR | 20100074328 A | | 7/2010 |

OTHER PUBLICATIONS

"Details on Mode 1 and Mode a for TDD ACK-NACK Feedback in Rel-10;" agenda item 6.2.1. 3GPP TSG RAN Wg1 Meeting #63bis—document for discussion and decision. Dublin, Ireland, Jan. 17-21, 2011.

3rd Generation Partnership Project; Technical Specification Group Radio Access Network; Evolved Universal Terrestrial Radio Access (E-UTRA); Physical Layer Procedures (Release 10). 3GPP TS 36.213; V10.1.0 (Mar. 2011).

Extended European Search Report for Application No. 12776723.4 dated Apr. 23, 2014.

European Office Action for Application No. 12776723.4 dated Aug. 7, 2015.

European Office Action for Application No. 12776723.4 dated Feb. 13, 2015.

Chinese Office Action for Application No. 2011101108433 dated Nov. 2, 2012, and its English translation thereof.

Korean Office Action for Application No. 10-2013-7031807 dated Aug. 29, 2015, and its English translation thereof.

* cited by examiner

METHOD AND APPARATUS FOR ACK/NACK TRANSMISSION

CROSS-REFERENCE TO RELATED APPLICATIONS

This application is a continuation of International Patent Application No. PCT/CN2012/072944 filed on Mar. 23, 2012. This application claims the benefit and priority of Chinese Application No. 201110110843.3, filed Apr. 29, 2011. The entire disclosures of each of the above applications are incorporated herein by reference.

BACKGROUND

This section provides background information related to the present disclosure which is not necessarily prior art.

In a long term evolution (LTE) time division duplex (TDD) system, a user equipment (UE, i.e., a user terminal device) may feed back acknowledgement (ACK)/negative acknowledgement (NACK) corresponding to multiple downlink subframes in an uplink subframe. After finishing the demodulation and decoding of the data in downlink subframes n-k, the UE feeds back signaling (i.e. ACK/NACK) in uplink subframe n to the base station in order to indicate whether data in the downlink subframe needs to be retransmitted, where k∈K, and the value of the set K is related to the TDD uplink (UL)-downlink (DL) configuration adopted by the system and the subframe index, as shown in Table 1.

The "feedback window" refers to K downlink subframes corresponding to the same uplink subframe.

Table 1 Downlink association set index K: $\{k_0, k_1, \ldots k_{M-1}\}$ for TDD

| UL-DL Configuration | \multicolumn{10}{c}{Subframe n} | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Two ACK/NACK feedback modes are supported by an LTE TDD system, i.e., ACK/NACK multiplexing and ACK/NACK bundling. For TDD UL-DL configuration 5, only ACK/NACK bundling is supported. The feedback mode adopted by a UE with ACK/NACK transmission is configured by higher layer signaling. When physical uplink control channel (PUCCH) format 1a/1b is used by a UE to feed back ACK/NACK, PUCCH format 1a/1b resource can be obtained through the following two manners according to the type of the data.

According to manner one, PUCCH resources corresponding to a semi-persistent scheduling (SPS) physical downlink shared channel (PDSCH) is configured semi-statically by higher layer.

According to manner two, PUCCH resources corresponding to a dynamically scheduled PDSCH or a physical downlink control channel (PDCCH) indicating SPS release is determined by the index of the first control channel element (CCE) occupied by the PDCCH.

When an LTE UE is configured with the ACK/NACK bundling with ACK/NACK transmission, the ACK/NACKs corresponding to codewords with the same index are bundled (i.e., logical AND) across the feedback window. FIG. 1 is a schematic diagram illustrating a conventional ACK/NACK bundling scheme.

For a single codeword transmission, 1-bit bundled ACK/NACK can be obtained and PUCCH format 1a is used for transmission. For multi-codeword (two codewords) transmissions, 2-bit bundled ACK/NACK can be obtained and PUCCH format 1b is used for transmission. The UE determines whether data is missed by the downlink assignment index (DAI) in a PDCCH. As shown in FIG. 1, the DAI value indicates the index of the dynamically scheduled downlink subframe in the current feedback window. The UE transmits bundled ACK/NACK using the uplink control channel resource corresponding to the PDCCH in which the DL DAI value is equal to 1.

When an LTE UE is configured with ACK/NACK multiplexing with ACK/NACK transmission, for the uplink subframe with M>1, where M is defined in Table 1, the ACK/NACKs corresponding to the multiple codewords in each DL subframe are bundled (i.e., spatial bundling), and NACK/discontinuous transmission (DTX) is generated as feedback information for the downlink subframe in which data is not received. FIG. 2 is a schematic diagram illustrating a conventional ACK/NACK multiplexing scheme. As such, M-bit ACK/NACK can be obtained and transmitted using PUCCH format 1b with channel selection according to the mapping relations as shown in Tables 2-4.

$n_{PUCCH,x}^{(1)}$ represents PUCCH resources corresponding to HARQ-ACK(x), and DTX indicates the data packet is not received. 2-bit information b(0) and b(1) and PUCCH resource used for transmission are obtained by looking up the table based on the state composed by M feedback bits. When M=1, the UE directly transmits a 1-bit or 2-bit ACK/NACK using PUCCH format 1a/1b in the only one available channel.

TABLE 2

LTE Rel-8/9 ACK/NACK mapping table, M = 2

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

TABLE 3

LTE Rel-8/9 ACK/NACK mapping table, M = 3

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |
| ACK, NACK/DTX, ACK | $n_{PUCCH,0}^{(1)}$ | 1, 1 |
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | N/A | N/A |

TABLE 4

LTE Rel-8/9 ACK/NACK mapping table, M = 4

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

TABLE 5

LTE-A ACK/NACK mapping table, A = 2

| HARQ-ACK(0) | HARQ-ACK(1) | $n_{PUCCH}^{(1)}$ | b(0), b(1) |
|---|---|---|---|
| ACK | ACK | $n_{PUCCH,1}^{(1)}$ | 1, 0 |
| ACK | NACK/DTX | $n_{PUCCH,0}^{(1)}$ | 1, 1 |
| NACK/DTX | ACK | $n_{PUCCH,1}^{(1)}$ | 0, 1 |
| NACK | NACK/DTX | $n_{PUCCH,0}^{(1)}$ | 0, 0 |
| DTX | NACK/DTX | | No Transmission |

TABLE 6

LTE-A ACK/NACK mapping table, A = 3

| HARQ-ACK(0) | HARQ-ACK(1) | HARQ-ACK(2) | $n_{PUCCH}^{(1)}$ | b(0), b(1) |
|---|---|---|---|---|
| ACK | ACK | ACK | $n_{PUCCH,2}^{(1)}$ | 1, 1 |
| ACK | ACK | NACK/DTX | $n_{PUCCH,1}^{(1)}$ | 1, 0 |
| ACK | NACK/DTX | ACK | $n_{PUCCH,2}^{(1)}$ | 1, 0 |
| ACK | NACK/DTX | NACK/DTX | $n_{PUCCH,0}^{(1)}$ | 1, 1 |
| NACK/DTX | ACK | ACK | $n_{PUCCH,2}^{(1)}$ | 0, 1 |
| NACK/DTX | ACK | NACK/DTX | $n_{PUCCH,1}^{(1)}$ | 0, 1 |
| NACK/DTX | NACK/DTX | ACK | $n_{PUCCH,2}^{(1)}$ | 0, 0 |
| NACK | NACK/DTX | NACK/DTX | $n_{PUCCH,0}^{(1)}$ | 0, 0 |
| DTX | NACK/DTX | NACK/DTX | | No Transmission |

TABLE 7

LTE-A ACK/NACK mapping table, A = 4

| HARQ-ACK(0) | HARQ-ACK(1) | HARQ-ACK(2) | HARQ-ACK(3) | $n_{PUCCH}^{(1)}$ | b(0), b(1) |
|---|---|---|---|---|---|
| ACK | ACK | ACK | ACK | $n_{PUCCH,1}^{(1)}$ | 1, 1 |
| ACK | ACK | ACK | NACK/DTX | $n_{PUCCH,2}^{(1)}$ | 1, 1 |
| ACK | ACK | NACK/DTX | ACK | $n_{PUCCH,0}^{(1)}$ | 1, 0 |
| ACK | ACK | NACK/DTX | NACK/DTX | $n_{PUCCH,1}^{(1)}$ | 1, 0 |
| ACK | NACK/DTX | ACK | ACK | $n_{PUCCH,3}^{(1)}$ | 1, 1 |
| ACK | NACK/DTX | ACK | NACK/DTX | $n_{PUCCH,2}^{(1)}$ | 1, 0 |
| ACK | NACK/DTX | NACK/DTX | ACK | $n_{PUCCH,0}^{(1)}$ | 0, 1 |
| ACK | NACK/DTX | NACK/DTX | NACK/DTX | $n_{PUCCH,0}^{(1)}$ | 1, 1 |
| NACK/DTX | ACK | ACK | ACK | $n_{PUCCH,1}^{(1)}$ | 0, 0 |
| NACK/DTX | ACK | ACK | NACK/DTX | $n_{PUCCH,2}^{(1)}$ | 0, 1 |
| NACK/DTX | ACK | NACK/DTX | ACK | $n_{PUCCH,3}^{(1)}$ | 1, 0 |
| NACK/DTX | ACK | NACK/DTX | NACK/DTX | $n_{PUCCH,1}^{(1)}$ | 0, 1 |
| NACK/DTX | NACK/DTX | ACK | ACK | $n_{PUCCH,3}^{(1)}$ | 0, 1 |
| NACK/DTX | NACK/DTX | ACK | NACK/DTX | $n_{PUCCH,2}^{(1)}$ | 0, 0 |
| NACK/DTX | NACK/DTX | NACK/DTX | ACK | $n_{PUCCH,3}^{(1)}$ | 0, 0 |
| NACK | NACK/DTX | NACK/DTX | NACK/DTX | $n_{PUCCH,0}^{(1)}$ | 0, 0 |
| DTX | NACK/DTX | NACK/DTX | NACK/DTX | | No Transmission |

Currently, aggregation of up to 5 carriers is supported by an LTE-A (long term evolution advanced) system. An LTE-A UE needs to feed back ACK/NACK corresponding to multiple downlink carriers and downlink subframes in one uplink subframe, and a relatively larger amount of information needs to be fed back. Therefore, a new PUCCH format 3 is defined in LTE-A as a scheme for multi-bit ACK/NACK transmission. Up to 20 bits can be transmitted using PUCCH format 3. With A UE configured with PUCCH format 3 for ACK/NACK transmission, 4 PUCCH resources are semi-statically configured by a base station via higher layer signaling. The base station then dynamically informs the UE of which resource is used for PUCCH transmission via PDCCH during data scheduling.

An LTE-A system also supports PUCCH format 1b with channel selection for ACK/NACK multiplexing transmission of no more than 4 bits, and 3 new ACK/NACK mapping tables are defined as shown in Tables 5-7. Compared with previous mapping tables, the new mapping tables do not include overlapping states, thus providing better performances.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

At present, for a Rel-10 UE not supporting carrier aggregation in a TDD system, the base station can configure the UE to use PUCCH format 3 for multi-bit ACK/NACK transmission. The transport power control (TPC) field in a PDCCH in which the DL DAI value is equal to 1 is used for carrying power control signaling, while the TPC field in a PDCCH in which the DL DAI value is larger than 1 is used as the ACK/NACK resource indicator (ARI) indicating the PUCCH format 3 resource used by the UE for ACK/NACK transmission. The ARIs in different PDCCHs within one feedback window are the same.

If the UE only receives the SPS PDSCH in the feedback window, the UE feeds back ACK/NACK for the SPS PDSCH on PUCCH resource configured by higher layer signaling.

If the UE only receives a PDCCH in which the DL DAI value is equal to 1 in the feedback window, the UE feeds back ACK/NACK on Rel-8 resource corresponding to the PDCCH.

If the UE receives a PDCCH in which the DL DAI value is larger than 1 in the feedback window, the UE feeds back ACK/NACK on the resource indicated by ARI, using PUCCH format 3.

PUCCH format 3 may be configured for a Rel-10 UE not supporting carrier aggregation to perform ACK/NACK transmission. When a UE only receives an SPS PDSCH and a PDCCH in which a DL DAI value is equal to 1 in a feedback window, the UE cannot obtain PUCCH format 3 resource. Various embodiments provide an ACK/NACK transmission mechanism for the situation.

Figure 1:
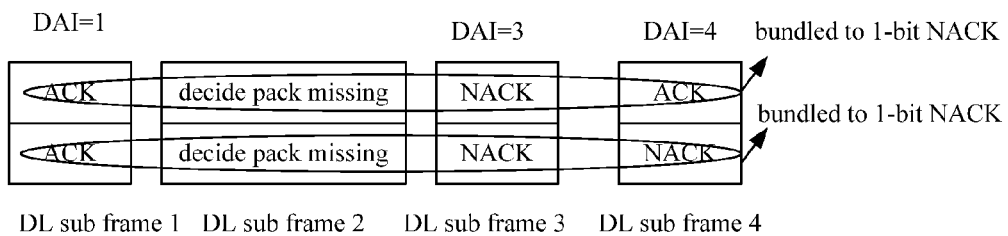
FIG. 1 is a schematic diagram illustrating a conventional ACK/NACK bundling scheme.
Figure 2:
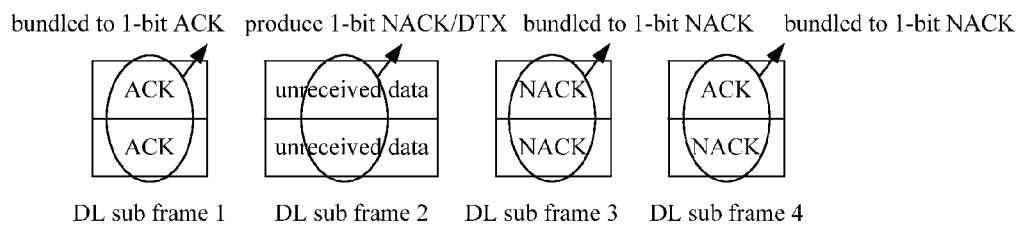
FIG. 2 is a schematic diagram illustrating a conventional ACK/NACK multiplexing scheme.
Figure 3:
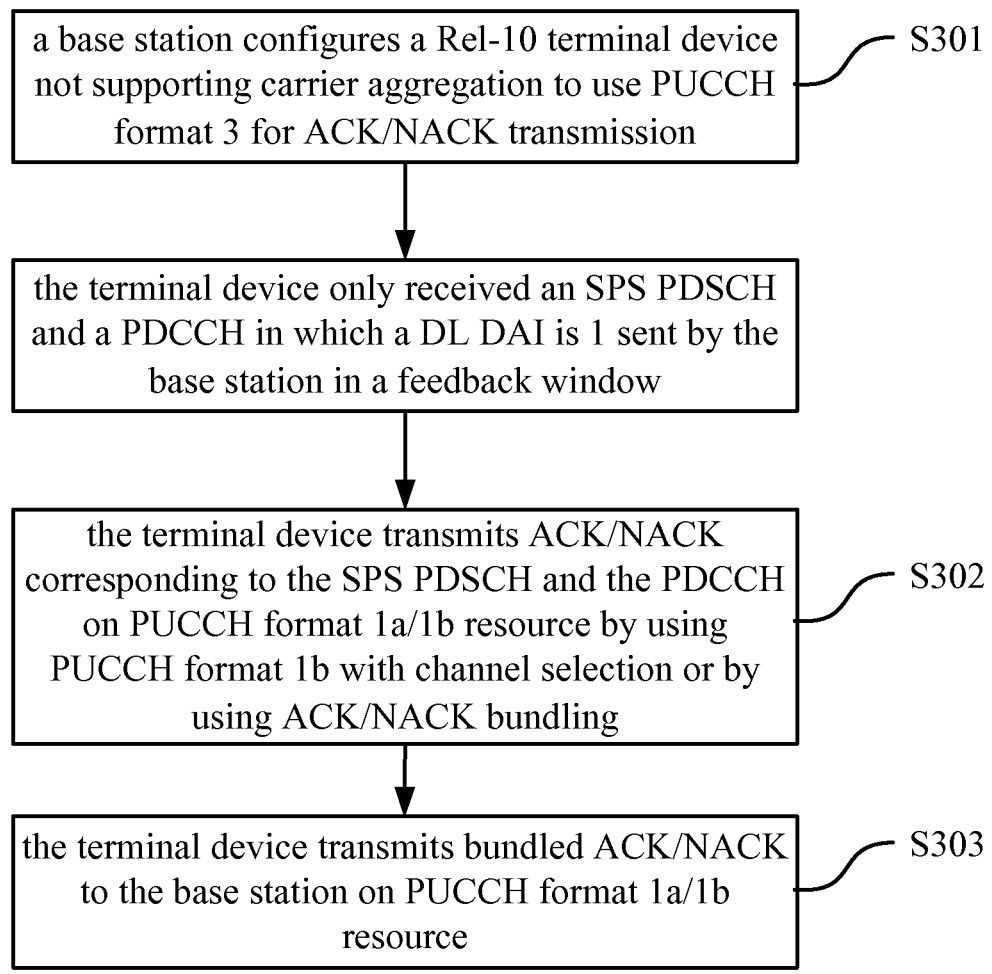
FIG. 3 is a flowchart illustrating a method for aCK/NACK transmission according to various embodiments.

FIG. 3 is a flowchart illustrating a method for ACK/NACK transmission according to various embodiments. The method may include the following procedures.

In block S301, a base station configures a Rel-10 terminal device not supporting carrier aggregation to use PUCCH format 3 for ACK/NACK transmission.

In block S302, when the terminal device only receives an SPS PDSCH and a PDCCH in which a DL DAI value is equal to 1 sent by the base station in a feedback window, the terminal device transmits ACK/NACK for the SPS PDSCH and the PDCCH on PUCCH format 1a/1b resource by using a feedback scheme of PUCCH format 1b with channel selection or ACK/NACK bundling.

In various embodiments, the feedback scheme of ACK/NACK bundling may be LTE Rel-8 TDD ACK/NACK bundling.

The procedure in block S302 may be implemented by using different manners according to different situations.

In situation 1, when the terminal device adopts ACK/NACK bundling for ACK/NACK transmission in block S302, the procedure may be as follows.

The terminal device bundles ACK/NACKs for codewords with the same index in the SPS PDSCH and the PDCCH in which the DL DAI value is equal to 1; or the terminal device spatially bundles ACK/NACKs for the SPS PDSCH and the PDCCH in which the DL DAI value is equal to 1.

The manner of the bundling may be determined according to the needs, and is not limited in the present disclosure.

The terminal device transmits the bundled ACK/NACK via PUCCH format 1a/1b resource corresponding to the PDCCH in which the DL DAI value is equal to 1.

In situation 2, when the terminal device adopts PUCCH format 1b with channel selection for ACK/NACK transmission in block S302, the terminal device may always use the ACK/NACK multiplexing mapping table with A=2 to perform the feedback, and the procedure may be as follows.

The terminal device determines information to be fed back by using the bundled ACK/NACK and the ACK/NACK multiplexing transmission mapping table defined for LTE-A Rel-10 PUCCH format 1b with channel selection when A=2, and determines PUCCH resource from among two PUCCH format 1a/1b resources.

The terminal device transmits information via the PUCCH resource determined.

In various embodiments, the ACK/NACK mapping table defined for LTE-A PUCCH format 1b with channel selection with A=2 may be the above Table 5. However, the process differs from a conventional process using the Table 5 in that Table 5 is used when the length of the feedback window is larger than 2 according to various embodiments; while according to the conventional process, the Table 5 is used only when the length of the feedback window is 2.

In various embodiments, for purposes of simplification and taking into consideration that there is no DTX state for a SPS PDSCH, the above Table 5 may be simplified into the following Table 8, and parameters in Table 8 are explained in the following.

TABLE 8

Simplified LTE-A ACK/NACK mapping table, A = 2

| HARQ-ACK(0) | HARQ-ACK(1) | $n_{PUCCH}^{(1)}$ | b(0), b(1) | d(0) |
|---|---|---|---|---|
| ACK | ACK | $n_{PUCCH,1}^{(1)}$ | 1, 0 | j |
| ACK | NACK/DTX | $n_{PUCCH,0}^{(1)}$ | 1, 1 | −1 |
| NACK | ACK | $n_{PUCCH,1}^{(1)}$ | 0, 1 | −j |
| NACK | NACK/DTX | $n_{PUCCH,0}^{(1)}$ | 0, 0 | 1 |

The HARQ-ACK(0) is ACK/NACK for an SPS PDSCH. $n_{PUCCH,0}^{(1)}$ is SPS PUCCH resource corresponding to the SPS PDSCH.

The HARQ-ACK(1) is ACK/NACK for a PDCCH in which a DL DAI value is equal to 1.

$n_{PUCCH,1}^{(1)}$ is PUCCH format 1a/1b resource determined according to $n_{CCE}$, $n_{CCE}$ is the index of the first CCE occupied by the PDCCH in which the DL DAI value is equal to 1.

The b(0), b(1) are information to be fed back.

The d(0) is a modulated symbol corresponding to the ACK/NACK.

The formal differences between the Table 8 and the Table 5 merely reflect the differences in application scenarios which have no impact on the usage of the table. Table 5 may also be used in embodiments with its parameters having the same meanings. The table used in practice is not restricted in the present disclosure.

In situation 3, the terminal device performs feedback by using an ACK/NACK multiplexing transmission mapping table corresponding to the number of bits in the ACK/NACK to be fed back. The process may be as follows.

When the terminal device is configured with a downlink single codeword transmission, the feedback is performed using the ACK/NACK multiplexing transmission mapping table with A=2, and the process is similar to that in situation 2.

When the terminal device is configured with a multi-codeword transmission, the ACK/NACK multiplexing transmission mapping table with A=3 may be used to determine the information to be transmitted, and PUCCH resource for information transmission is determined from among three PUCCH format 1a/1b resources.

The terminal device transmits information via the PUCCH resource determined.

In various embodiments, the ACK/NACK mapping table defined for LTE-A Rel-10 TDD PUCCH format 1b with channel selection with A=3 may be the above Table 6. However, the process differs from a conventional process using the Table 6 in that Table 6 is used when the maximum number of bits of the ACK/NACK in a feedback window is larger than 2 according to various embodiments; while according to the conventional process, Table 6 is used only when the maximum number of bits of the ACK/NACK in the feedback window is 3. In addition, according to the conventional process, the types of data respectively corresponding to HARQ-ACK(0), HARQ-ACK(1) and HARQ-ACK(2) are determined according to the order of the time the data was received. However, according to various embodiments, the types of data respectively corresponding to HARQ-ACK(0), HARQ-ACK(1) and HARQ-ACK(2) need to be determined.

In various embodiments, for purposes of simplification and taking into consideration that there is no DTX state for a SPS PDSCH, the above Table 6 may be simplified into the following Table 9, and parameters in Table 9 are explained in the following.

TABLE 9

Simplified LTE-A ACK/NACK mapping table, A = 3

| HARQ-ACK(0) | HARQ-ACK(1) | HARQ-ACK(2) | $n_{PUCCH}^{(1)}$ | b(0), b(1) |
|---|---|---|---|---|
| ACK | ACK | ACK | $n_{PUCCH,2}^{(1)}$ | 1, 1 |
| ACK | ACK | NACK/DTX | $n_{PUCCH,1}^{(1)}$ | 1, 0 |
| ACK | NACK/DTX | ACK | $n_{PUCCH,2}^{(1)}$ | 1, 0 |
| ACK | NACK/DTX | NACK/DTX | $n_{PUCCH,0}^{(1)}$ | 1, 1 |
| NACK/DTX | ACK | ACK | $n_{PUCCH,2}^{(1)}$ | 0, 1 |
| NACK/DTX | ACK | NACK/DTX | $n_{PUCCH,1}^{(1)}$ | 0, 1 |
| NACK/DTX | NACK/DTX | ACK | $n_{PUCCH,2}^{(1)}$ | 0, 0 |
| NACK | NACK/DTX | NACK/DTX | $n_{PUCCH,0}^{(1)}$ | 0, 0 |

The HARQ-ACK(0) is ACK/NACK for an SPS PDSCH.

The HARQ-ACK(1) is ACK/NACK for codeword 1 corresponding to a PDCCH in which a DL DAI value is equal to 1.

The HARQ-ACK(2) is ACK/NACK for codeword 2 corresponding to the PDCCH in which the DL DAI value is equal to 1.

$n_{PUCCH,0}^{(1)}$ is SPS PUCCH format 1a/1b resource for the SPS PDSCH.

$n_{PUCCH,1}^{(1)}$ is PUCCH format 1a/1b resource determined according to $n_{CCE}$, $n_{CCE}$ is the index of the first CCE occupied by the PDCCH in which the DL DAI value is equal to 1.

$n_{PUCCH,2}^{(1)}$ is PUCCH format 1a/1b resource obtained by using $n_{CCE}+1$.

The b(0), b(1) are information to be fed back.

It can be seen that the above situations 2 and 3 are situations when the terminal device adopts PUCCH format 1b with channel selection and transmits ACK/NACK for an SPS PDSCH and a PDCCH in which a DL DAI value is equal to 1 via PUCCH format 1a/1b resource. The method to be adopted in practice may be determined and adjusted according to the needs, and this is not limited in the present disclosure.

Figure 4:
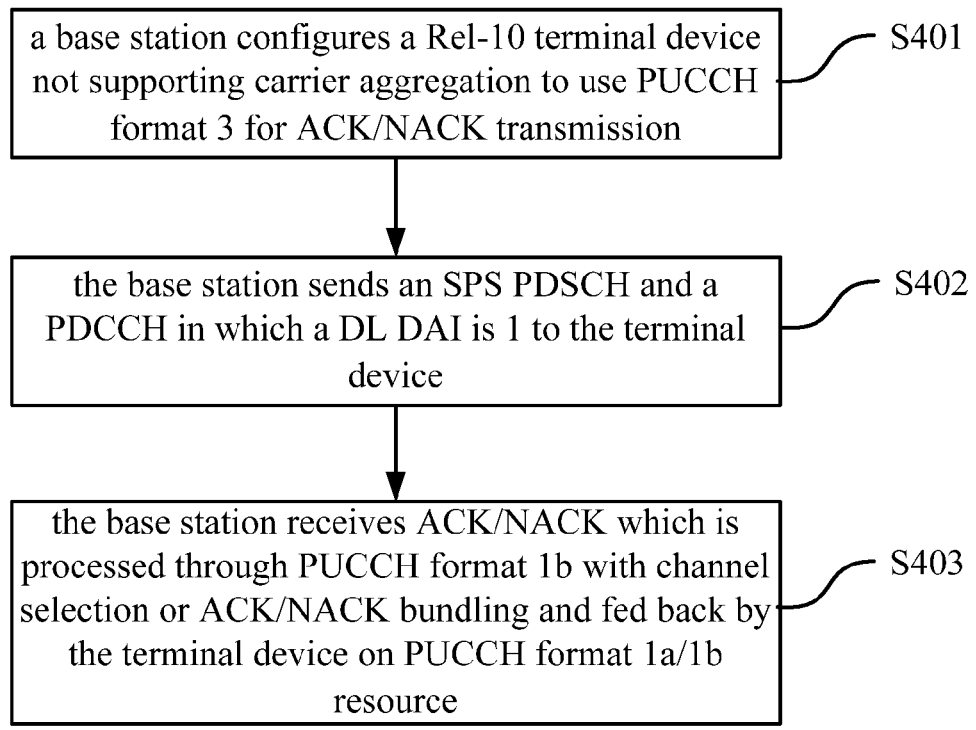
FIG. 4 is a flowchart illustrating a method for aCK/NACK transmission according to various embodiments.

FIG. 4 is a flowchart illustrating a process for ACK/NACK transmission implemented at a base station according to various embodiments. The process may include the following procedures.

In block S401, a base station configures a Rel-10 terminal device not supporting carrier aggregation to use PUCCH format 3 for ACK/NACK transmission.

In block S402, the base station sends an SPS PDSCH and a PDCCH in which a DL DAI value is equal to 1 to the terminal device.

In block S403, the base station receives ACK/NACK which is processed through PUCCH format 1b with channel selection or through ACK/NACK bundling and is fed back by the terminal device on PUCCH format 1a/1b resource.

In various embodiments, the feedback scheme of ACK/NACK bundling may be LTE Rel-8 TDD ACK/NACK bundling.

Corresponding to the three situations mentioned in block S302, this procedure also includes three situations.

In situation 1, the base station receives ACK/NACK which has been processed through ACK/NACK bundling and is fed back by the terminal device via PUCCH format 1a/1b resource.

If the base station did not transmit a PDCCH in which a DL DAI is larger than 1 to the terminal device in the feedback window, the base station receives the ACK/NACK which has been processed through ACK/NACK bundling and is fed back by the terminal device via the PUCCH format 1a/1b resource corresponding to the PDCCH in which the DL DAI value is equal to 1.

If the base station also transmitted a PDCCH in which the DL DAI is larger than 1 to the terminal device in the feedback window, the base station monitors PUCCH format 3 resource specified by ARI and receives ACK/NACK which has been processed through ACK/NACK bundling and is fed back by the terminal device and ACK/NACK for the PDCCH in which the DL DAI is larger than 1 via the PUCCH format 3 resource. If the feedback information is not detected, it is determined the PDCCH in which the DL DAI is larger than 1 is missed.

In various embodiments, when the PDCCH in which the DL DAI is larger than 1 is missed, the terminal device cannot determine the PUCCH format 3 resource corresponding to the PDCCH, and may transmit ACK/NACK in other manners. Correspondingly, the base station may further perform the following procedures to receive such ACK/NACK.

The base station monitors PUCCH resources corresponding to the last transmitted subframe between the subframe in which the SPS PDSCH is transmitted and the subframe in which the PDCCH in which the DL DAI value is equal to 1 is transmitted, and receives the bundled ACK/NACK fed back by the terminal device under an ACK/NACK bundling mode.

In situation 2, the base station receives ACK/NACK which has been processed according to the LTE-A Rel-10 ACK/NACK multiplexing transmission mapping table with A=2 and is fed back by the terminal device via PUCCH format 1a/1b resource.

If the base station did not transmit a PDCCH in which a DL DAI is larger than 1 to the terminal device in the feedback window, the base station receives ACK/NACK which has been processed through spatial bundling according to the LTE-A Rel-10 ACK/NACK multiplexing transmission mapping table with A=2 and is fed back by the terminal device via PUCCH resource corresponding to the SPS PDSCH and the PDCCH in which the DL DAI value is equal to 1.

If the base station also transmitted a PDCCH in which the DL DAI is larger than 1 to the terminal device in the feedback window, the base station monitors PUCCH format 3 resource specified by ARI and receives ACK/NACK for the PDCCH in which the DL DAI is larger than 1 via the PUCCH format 3 resource. If the feedback information is not detected, it is determined the PDCCH in which the DL DAI is larger than 1 is missed.

In various embodiments, if the PDCCH in which the DL DAI is larger than 1 is missed, the terminal device cannot determine the PUCCH format 3 resource corresponding to the PDCCH, therefore may transmit ACK/NACK in other manners. Correspondingly, the base station may further perform the following procedures to receive such ACK/NACK.

The base station receives ACK/NACK which has been processed through spatial bundling and is fed back by the terminal device via PUCCH resource corresponding to the SPS PDSCH and the PDCCH in which the DL DAI value is equal to 1 according to the LTE-A Rel-10 ACK/NACK multiplexing transmission mapping table with A=2.

In situation 3, the base station receives ACK/NACK which has been processed according to the LTE-A Rel-10 ACK/NACK multiplexing transmission mapping table with A=2 or A=3 and is fed back by the terminal device via PUCCH format 1a/1b resource.

The ACK/NACK multiplexing transmission mapping table to be adopted may be determined by using the number of bits in the ACK/NACK configured in the terminal device.

If the terminal device is configured with downlink single codeword transmission, the base station receives ACK/NACK which has been processed by using the LTE-A Rel-10 ACK/NACK multiplexing transmission mapping table with A=2 and is fed back by the terminal device via PUCCH format 1 all b resource.

If the terminal device is configured with downlink multi-codeword transmission, the base station receives ACK/NACK which has been processed by using the LTE-A Rel-10 ACK/NACK multiplexing transmission mapping table with A=3 and is fed back by the terminal device via PUCCH format 1a/1b resource.

If the base station did not transmit a PDCCH in which a DL DAI is larger than 1 to the terminal device in the feedback window, the base station receives ACK/NACK which has been processed through spatial bundling according to the LTE-A Rel-10 ACK/NACK multiplexing transmission mapping table with A=2 or A=3 and is fed back by the terminal device via PUCCH resource corresponding to the SPS PDSCH and the PDCCH in which the DL DAI value is equal to 1.

If the base station also transmitted a PDCCH in which the DL DAI is larger than 1 to the terminal device in the feedback window, the base station monitors PUCCH format 3 resource specified by ARI and receives ACK/NACK for the PDCCH in which the DL DAI is larger than 1 on the PUCCH format 3 resource. If the feedback information is not detected, it is determined the PDCCH in which the DL DAI is larger than 1 is missed.

In various embodiments, if the PDCCH in which the DL DAI is larger than 1 is missed, the terminal device cannot determine the PUCCH format 3 resource corresponding to the PDCCH, therefore may transmit ACK/NACK in other manners. Correspondingly, the base station may further perform the following procedures to receive such ACK/NACK.

The base station receives ACK/NACK which has been processed through spatial bundling and is fed back by the terminal device on PUCCH resource corresponding to the SPS PDSCH and the PDCCH in which the DL DAI value is equal to 1 according to the LTE-A Rel-10 ACK/NACK multiplexing transmission mapping table with A=2 or A=3.

Various embodiments also provide a method for transmitting ACK/NACK via PUCCH format 3 resource configured for an SPS PDSCH.

If a base station configures PUCCH format 3 resource for an SPS PDSCH for a terminal device, if the terminal device received an SPS PDSCH transmitted by the base station in a feedback window, the terminal device transmits ACK/NACK for the SPS PDSCH via the PUCCH format 3 resource.

Correspondingly, if the base station has transmitted the SPS PDSCH to the terminal device in the feedback window, the base station may receive the ACK/NACK sent by the terminal device via the PUCCH format 3 resource configured for the terminal device.

According to the mechanism provided by various embodiments, when a UE only received an SPS PDSCH and a PDCCH in which the DAI value is equal to 1 in a feedback window, the terminal device transmits ACK/NACK via PUCCH format 1a/1b resource corresponding to the SPS PDSCH and the PDCCH by using a feedback scheme of PUCCH format 1b with channel selection or ACK/NACK bundling. Therefore, if a base station configures feedback using PUCCH format 3 resource but a terminal device cannot obtain the PUCCH format 3 resource, the mechanism provide a solution for aCK/NACK transmission.

The technical scheme provided by various embodiments is illustrated as follows by referring to several application scenarios.

In various embodiments, a base station may configure a Rel-10 terminal device not supporting carrier aggregation to use PUCCH format 3 resource for ACK/NACK transmission.

In various embodiments, there are three methods for a UE which only received an SPS PDSCH and a PDCCH in which a DL DAI value is equal to 1 in a feedback window.

According to a first method, ACK/NACK bundling is adopted for processing the feedback information.

The UE may perform feedback by using a Rel-8 ACK/NACK bundling scheme, i.e., bundling ACK/NACK corresponding to the SPS PDSCH and the PDCCH in which the DL DAI value is equal to 1. The bundling is performed in unit of codeword, i.e., bundling ACK/NACK bits corresponding to codewords with the same index, bundled information of 1 bit or 2 bits may be obtained. The bundled information may be transmitted via PUCCH resource corresponding to the PDCCH in which the DL DAI value is equal to 1.

Alternatively, the UE may bundle the ACK/NACK by using spatial bundling, i.e., spatially bundling ACK/NACK for the SPS PDSCH and the PDCCH in which the DL DAI value is equal to 1. The bundling scheme to be adopted may be determined according to the needs.

Correspondingly, a processing flow performed at the base station may be as follows.

If the base station did not transmit a PDCCH in which a DL DAI is larger than 1 in the feedback window, the base station receives ACK/NACK via PUCCH resource corresponding to the PDCCH in which the DL DAI value is equal to 1.

If the base station has transmitted a PDCCH in which a DL DAI is larger than 1 in the feedback window, the base station may monitor PUCCH format 3 resource specified by ARI and receives ACK/NACK via the PUCCH format 3 resource. When no feedback corresponding to the PDCCH in which the DL DAI is larger than 1, it is determined that the PDCCH is missed. The base station may further monitor PUCCH resource corresponding to a subframe which is one of two subframes and was transmitted after the other of the two subframes and receive ACK/NACK via the PUCCH resource, where the two subframes refer to a subframe in which the SPS PDSCH is transmitted and a subframe in which the PDCCH in which the DL DAI value is equal to 1 is transmitted.

According to a second method, PUCCH format 1b with channel selection is adopted for feedback.

The UE may first spatially bundle ACK/NACK to be fed back, and transmit 2-bit information, i.e., b(0) and b(1), determined by using the LTE-A TDD mapping table with A=2 (i.e., the Table 5) via a channel determined. HARQ-ACK(0) is ACK/NACK for the SPS PDSCH, $n_{PUCCH,0}^{(1)}$ is PUCCH resource corresponding to the SPS PDSCH; HARQ-ACK(1) is ACK/NACK for the PDCCH in which the DL DAI value is equal to 1, $n_{PUCCH,1}^{(1)}$ is PUCCH resource corresponding to the PDCCH in which the DL DAI value is equal to 1. Since there is no DTX state for SPS PDSCH, Table 5 may be simplified into the form of Table 8.

In various embodiments, the ACK/NACK multiplexing transmission mapping table with A=2 or A=3 may also be adopted.

Various embodiments may always adopt the ACK/NACK multiplexing transmission mapping table with A=2.

In various embodiments, it is determined based on the number of bits in the ACK/NACK configured for the terminal device that whether the ACK/NACK multiplexing transmission mapping table with A=2 or A=3 is to be adopted.

In various embodiments, if the terminal device is configured to perform downlink single codeword transmission, the ACK/NACK multiplexing transmission mapping table with A=2 is adopted.

If the terminal device is configured with downlink multi-codeword transmission, the ACK/NACK multiplexing transmission mapping table with A=3 may be used to determine information to be transmitted, and PUCCH resource for transmitting the information is determined from among three PUCCH format 1a/1b resources.

In various embodiments, the position of the HARQ-ACK corresponding to each data packet is restricted for addressing the inconsistence in understanding of the base station and the UE when the UE failed to receive the PDCCH in which the DL DAI is set be to 1.

For example, a base station transmits an SPS PDSCH and a PDCCH in which a DL DAI value is equal to 1 in a feedback window, but the UE only received the SPS PDSCH. The UE may feed back d(0)=1 via resource corresponding to the SPS PDSCH (the SPS PDSCH corresponds to NACK) or d(0)=−1 (the SPS PDSCH corresponds to ACK). The d(0) is a modulated symbol corresponding to the feedback information.

The base station still receives feedback information according to the mapping relations in Table 8 or Table 9, and the result is as follows.

If d(0)=1 is received on $n_{PUCCH,0}^{(1)}$, the feedback information for the SPS PDSCH is NACK, and the feedback information for the PDCCH in which the DL DAI value is equal to 1 is NACK/DTX.

If d(0)=−1 is received on $n_{PUCCH,0}^{(1)}$, the feedback information for the SPS PDSCH is ACK, and the feedback information for the PDCCH in which the DL DAI value is equal to 1 is NACK/DTX.

Hence, the result is consistent with the reception result of the UE.

Correspondingly, a processing flow performed at the base station may be as follows.

If the base station has transmitted an SPS PDSCH and a PDCCH in which a DL DAI value is equal to 1 in the feedback window, the base station receives ACK/NACK via PUCCH resource corresponding to the SPS PDSCH and the PDCCH in which the DL DAI value is equal to 1 by using the mapping relation in Table 8.

If the base station has transmitted a PDCCH in which a DAI is larger than 1 in the feedback window, the base station may monitor PUCCH format 3 resource specified by ARI and receives ACK/NACK via the PUCCH format 3 resource. If feedback information corresponding to the PDCCH in which the DL DAI is larger than 1 is not detected, it is determined the PDCCH is missed. The base station may monitor PUCCH resource corresponding to the SPS PDSCH and the PDCCH in which the DL DAI value is equal to 1 and receives ACK/NACK from the PUCCH resource by using the mapping relation in Table 8.

According to a third method, the base station may configure PUCCH format 3 resource for SPS PDSCH.

If there is an SPS PDSCH in a feedback window and the base station has configured PUCCH format 3 resource for the SPS PDSCH, the UE may always transmit ACK/NACK via the PUCCH format 3 resource corresponding to the SPS PDSCH.

Accordingly, the base station may receive ACK/NACK from the PUCCH format 3 resource corresponding to the SPS PDSCH in the feedback window in which the SPS PDSCH is transmitted.

According to the mechanism provided by various embodiments, when a UE only received an SPS PDSCH and a PDCCH in which the DAI value is equal to 1 in a feedback window, the terminal device transmits ACK/NACK via PUCCH format 1a/1b resource corresponding to the SPS PDSCH and the PDCCH by using a feedback scheme of PUCCH format 1b with channel selection or ACK/NACK bundling. Therefore, when a base station configures feedback using PUCCH format 3 resource but a terminal device cannot obtain the PUCCH format 3 resource, the mechanism provide a solution for aCK/NACK transmission.

Various embodiments also provide apparatuses corresponding to the methods.

Figure 5:
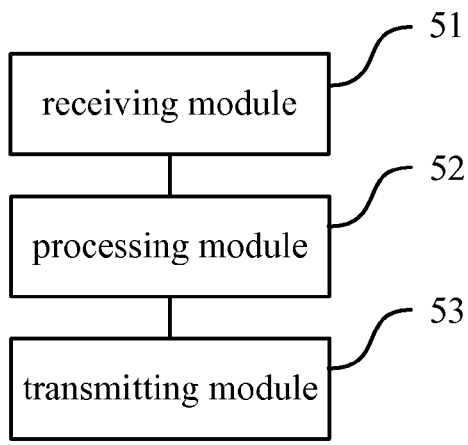
FIG. 5 is a schematic diagram illustrating a structure of a terminal device according to various embodiments.

Corresponding to the block S301 to block S303, a terminal device is provided. FIG. 5 is a schematic diagram illustrating a structure of the terminal device. The terminal device may include the following components.

A receiving module 51 is configured to receive information sent by a base station.

A processing module 52 is configured to process received information by using a feedback scheme of PUCCH format 1b with channel selection or ACK/NACK bundling when the receiving module 51 only received an SPS PDSCH and a PDCCH in which a DL DAI value is equal to 1 sent by the base station in a feedback window.

A transmitting module 53 is configured to transmit ACK/NACK bundled by the processing module 52 via PUCCH format 1a/1b resource.

In various embodiments, the processing module 52 may:
determine information to be transmitted by using an LTE-A ACK/NACK multiplexing transmission mapping table, and determine PUCCH resource for transmitting the information from among multiple PUCCH format 1a/1b resources;
bundle ACK/NACK for codewords with the same index in the SPS PDSCH and the PDCCH in which the DL DAI value is equal to 1; or
spatially bundle ACK/NACK for the SPS PDSCH and the PDCCH in which the DL DAI value is equal to 1.

Correspondingly, the transmitting module 53 may:
transmit the information via the PUCCH resource determined by the processing module 52 when the processing module 52 adopts PUCCH format 1b with channel selection; or
transmit the bundled information via PUCCH format 1a/1b resource corresponding to the PDCCH in which the DL DAI value is equal to 1 when the processing module 52 adopts ACK/NACK bundling.

In various embodiments, the processing module 52 may:
adopt the LTE-A Rel-10 ACK/NACK multiplexing transmission mapping table with A=2 when the terminal device is configured with downlink single codeword transmission; or
adopt the LTE-A Rel-10 ACK/NACK multiplexing transmission mapping table with A=3 when the terminal device is configured with downlink multi-codeword transmission.

In various embodiments, the processing module 52 may:
adopt the LTE-A Rel-10 ACK/NACK multiplexing transmission mapping table with A=2 for all situations; or
generate 2-bit bundled ACK/NACK through spatial bundling when the terminal device is configured with downlink multi-codeword transmission.

Figure 6:
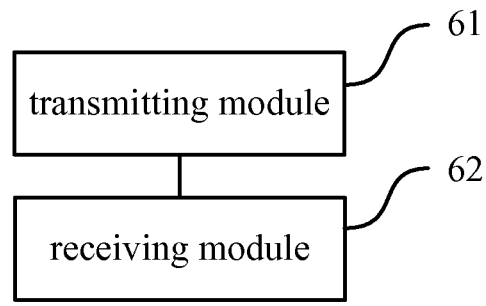
FIG. 6 is a schematic diagram illustrating a structure of a base station according to various embodiments.

Corresponding to the block S401 to block S403, a base station is provided. FIG. 6 is a schematic diagram illustrating a structure of the base station. The base station may include the following components.

A transmitting module 61 is configured to transmit information to a terminal device.

A receiving module 62 is configured to receive ACK/NACK which is fed back by the terminal device and has been processed through PUCCH format 1b with channel selection or through ACK/NACK bundling from PUCCH format 1a/1b resource when the transmitting module 61 has transmitted an SPS PDSCH and a PDCCH in which a DL DAI value is equal to 1 to the terminal device.

In various embodiments, the receiving module 62 may:
receive the ACK/NACK which has been processed through ACK/NACK bundling and is fed back by the terminal device via the PUCCH format 1a/1b resource corresponding to the PDCCH in which the DL DAI value is equal to 1 when the transmitting module 61 did not transmit a PDCCH in which a DL DAI is larger than 1 to the terminal device in the feedback window; or
monitor PUCCH format 3 resource specified by ARI and receive ACK/NACK which has been processed through ACK/NACK bundling and is fed back by the terminal device and ACK/NACK for the PDCCH in which the DL DAI is larger than 1 via the PUCCH format 3 resource when the base station also transmitted a PDCCH in which the DL DAI is larger than 1 to the terminal device in the feedback window, determine the PDCCH in which the DL DAI is larger than 1 is missed if the feedback information is not detected.

In various embodiments, the receiving module 62 may:
monitor PUCCH resource corresponding to the last transmitted subframe between the subframe in which the SPS PDSCH is transmitted and the subframe in which the PDCCH in which the DL DAI value is equal to 1 is transmitted in response to a determination that the PDCCH in which the DL DAI is larger than 1 is missed, and receive ACK/NACK which has been processed through ACK/NACK bundling and is fed back by the terminal device from the PUCCH resource.

In various embodiments, the receiving module 62 may:
receive ACK/NACK which has been processed through PUCCH format 1b with channel selection and is fed back by the terminal device via PUCCH resource corresponding to the SPS PDSCH and the PDCCH in which the DL DAI value is equal to 1 sent to the terminal device according to an LTE-A Rel-10 ACK/NACK multiplexing transmission mapping table when the transmitting module 61 did not transmit a PDCCH in which a DL DAI is larger than 1 to the terminal device in the feedback window; or
monitor PUCCH format 3 resource specified by ARI and receive ACK/NACK for the PDCCH in which the DL DAI is larger than 1 via the PUCCH format 3 resource when the transmitting module 61 also transmitted a PDCCH in which the DL DAI is larger than 1 to the terminal device in the feedback window, determine the PDCCH in which the DL DAI is larger than 1 is missed when the feedback information is not detected.

In various embodiments, the receiving module 62 may:
receive ACK/NACK which has been processed through PUCCH format 1b with channel selection and is fed back by the terminal device via PUCCH resource corresponding to the SPS PDSCH and the PDCCH in which the DL DAI value is equal to 1 sent to the terminal device according to an LTE-A ACK/NACK multiplexing transmission mapping table in response to a determination that the PDCCH in which a DL DAI is larger than 1 is missed.

Figure 7:
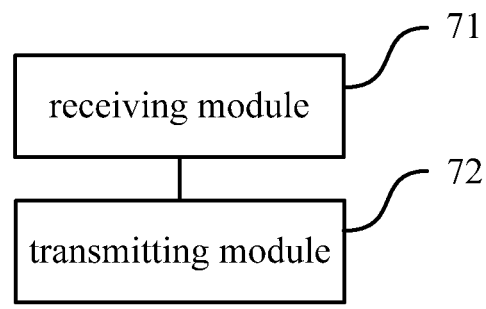
FIG. 7 is a schematic diagram illustrating a structure of a terminal device according to various embodiments.

Corresponding to the method for transmitting ACK/NACK which configures PUCCH format 3 resource for SPS PDSCH, various embodiments also provide a terminal device. FIG. 7 is a schematic diagram illustrating a structure of a terminal device according to various embodiments. The terminal device may include the following components.

A receiving module 71 is configured to receive information sent by a base station.

A transmitting module 72 is configured to transmit ACK/NACK via PUCCH format 3 resource to the base station when the receiving module 71 has received an SPS PDSCH sent by the base station in a feedback window.

The receiving module 71 may further receive an instruction for configuring the PUCCH format 3 resource sent by the base station.

Figure 8:
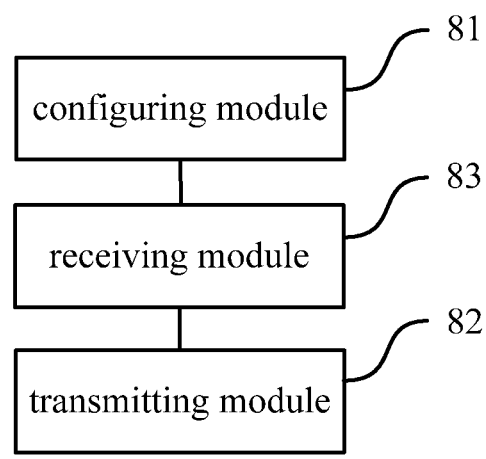
FIG. 8 is a schematic diagram illustrating a structure of a base station according to various embodiments.

Accordingly, various embodiments also provide a base station. FIG. 8 is a schematic diagram illustrating a structure of a base station according to an example of the present disclosure. The base station may include the following components.

A configuring module 81 configures PUCCH format 3 resource for a terminal device.

A transmitting module 82 transmits information to the terminal device.

A receiving module 83 receives ACK/NACK sent by the terminal device via the PUCCH format 3 resource configured for the terminal device by the configuring module 81 when the transmitting module 82 has transmitted an SPS PDSCH to the terminal device in a feedback window.

According to the mechanism provided by various embodiments, when a UE only received an SPS PDSCH and a PDCCH in which the DAI value is equal to 1 in a feedback window, the terminal device transmits ACK/NACK via PUCCH format 1a/1b resource corresponding to the SPS PDSCH and the PDCCH by using a feedback scheme of PUCCH format 1b with channel selection or ACK/NACK bundling. Therefore, when a base station configures feedback using PUCCH format 3 resource but a terminal device cannot obtain the PUCCH format 3 resource, the mechanism provide a solution for aCK/NACK transmission.

Through the above description, one skilled in the art would recognize that various embodiments may be implemented by hardware or by a general-purpose hardware platform together with software. Therefore, the technical scheme provided by the embodiments may be in the form of a software product which may be stored in a non-transient storage medium (e.g., a CD-ROM, a flash disk, a mobile hard disk, etc.) and includes several instructions to cause a computer (e.g., a PC, a server, a network device, etc.) to execute the methods provided by various embodiments for various application scenarios.

One skilled in the art would recognize each of the drawings are merely a schematic diagrams of an embodiment, and not all the modules and the procedures in the drawings are necessary for implementing the present invention.

One skilled in the art would recognize the modules in the apparatus of various embodiments may be located in the apparatus as described in the embodiments, or may be located in one or more apparatuses of the various embodiments when modified accordingly. The modules in various embodiments may be combined into one module, or may be further divided into multiple sub modules.

The index numbers of the embodiments are merely for facilitating description, and should not be interpreted to be representative for the preference order of the embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for acknowledgement/negative acknowledgement (ACK/NACK) transmission, comprising:
    transmitting, by a terminal device which is configured with physical uplink control channel (PUCCH) format 3 for ACK/NACK transmission, ACK/NACK feedback information corresponding to a semi-persistent scheduling (SPS) physical downlink shared channel (PDSCH) and ACK/NACK feedback information corresponding to a physical downlink control channel (PDCCH) in which a downlink (DL) downlink assignment index (DAI) value is equal to 1 on PUCCH format 1a/1b resource using PUCCH format 1b with channel selection or ACK/NACK bundling when only the SPS PDSCH and the PDCCH in which the DL DAI value is equal to 1 are received in a feedback window.

2. The method of claim 1, wherein the transmitting by the terminal device ACK/NACK feedback information corresponding to the SPS PDSCH and the ACK/NACK feedback information corresponding to the PDCCH in which the DL DAI value is equal to 1 on PUCCH format 1a/1b resource using PUCCH format 1b with channel selection comprises:
    determining information to be transmitted and PUCCH resource for transmitting the information from multiple PUCCH format 1a/1b resources by using an LTE-A mapping table for ACK/NACK multiplexing transmission;
    transmitting the information on the determined PUCCH resource.

3. The method of claim 2, wherein the transmitting the information to the base station by using the LTE-A ACK/NACK multiplexing transmission mapping table comprises:
    transmitting the ACK/NACK feedback information corresponding to the SPS PDSCH and the ACK/NACK feedback information corresponding to the PDCCH in which the DL DAI value is equal to 1 by using the LTE-A Rel-10 mapping table for ACK/NACK multiplexing transmission with A=2;
    generating 2-bit bundled ACK/NACK through spatial bundling when the terminal device is configured with downlink multi-codeword transmission.

4. The method of claim 3, wherein transmitting the ACK/NACK feedback information corresponding to the SPS PDSCH and the ACK/NACK feedback information corresponding to the PDCCH in which the DL DAI value is equal to 1 by using the LTE-A Rel-10 ACK/NACK multiplexing transmission mapping table with A=2 comprises determining parameters in the LTE-A Rel-10 ACK/NACK multiplexing transmission mapping table with A=2 to be:
    hybrid automatic repeat request (HARQ)-ACK(0) is the ACK/NACK feedback information corresponding to the SPS PDSCH;
    HARQ-ACK(1) is the ACK/NACK feedback information corresponding to the PDCCH in which the DL DAI value is equal to 1;

$$n^{(1)}_{PUCCH,0}{}_{n^{(1)}_{PUCCH,0}}$$

is the PUCCH format 1a/1b resource corresponding to the SPS PDSCH; and $$n^{(1)}_{PUCCH,1}{}_{n^{(1)}_{PUCCH,1}}$$

is the PUCCH format 1a/1b resource determined according to $n^{CCE}_{n_{CCE}}$, where $n^{CCE}_{n_{CCE}}$ is the index of the first CCE occupied by the PDCCH in which the DL DAI value is equal to 1.

5. The method of claim 2, wherein the transmitting by the terminal device the information to the base station by using the LTE-A Rel-10 ACK/NACK multiplexing transmission mapping table comprises:
    transmitting, by the terminal device, the ACK/NACK feedback information corresponding to the SPS PDSCH and the ACK/NACK feedback information corresponding to the PDCCH in which the DL DAI value is equal to 1 by using the LTE-A Rel-10 mapping table for ACK/NACK multiplexing transmission with A=2 when the terminal device is configured with downlink single codeword transmission; or
    transmitting, by the terminal device, the ACK/NACK feedback information corresponding to the SPS PDSCH and the ACK/NACK feedback information corresponding to the PDCCH in which the DL DAI value is equal to 1 by using the LTE-A Rel-10 ACK/NACK mapping table for multiplexing transmission with A=3 when the terminal device is configured with downlink multi-codeword transmission.

6. The method of claim 5, wherein transmitting the information to the base station by using the LTE-A Rel-10 ACK/NACK multiplexing transmission mapping table comprises determining parameters in LTE-A Rel-10 ACK/NACK multiplexing transmission mapping tables with A=2 or A=3 to be:
  HARQ-ACK(0) is the ACK/NACK feedback information corresponding to the SPS PDSCH;
  HARQ-ACK(1) is ACK/NACK feedback information corresponding to codeword 1 of the PDCCH in which the DL DAI value is equal to 1;
  HARQ-ACK(2) is ACK/NACK feedback information corresponding to codeword 2 of the PDCCH in which the DL DAI value is equal to 1;

$n_{PUCCH,0}^{(1)}$ is the SPS PUCCH format 1a/1b resource corresponding to the SPS PDSCH;

$n_{PUCCH,1}^{(1)}$ is the PUCCH format 1a/1b resource determined according to $n_{CCE}$, where $n_{CCE}$ is the index of the first CCE occupied by the PDCCH in which the DL DAI value is equal to 1; and $n_{PUCCH,2}^{(1)}$ is the PUCCH format 1a/1b resource determined by $n_{CCE+1}$.

7. The method of claim 1, wherein the transmitting the ACK/NACK feedback information corresponding to the SPS PDSCH and the ACK/NACK feedback information corresponding to the PDCCH in which the DL DAI value is equal to 1 using ACK/NACK bundling comprises:
  bundling, by the terminal device, ACK/NACK feedback information corresponding to codewords with the same index in the SPS PDSCH and the PDCCH in which the DL DAI value is equal to 1; or
  spatially bundling, by the terminal device, the ACK/NACK feedback information corresponding to the SPS PDSCH and the ACK/NACK feedback information corresponding to the PDCCH in which the DL DAI value is equal to 1.

8. The method of claim 7, wherein the transmitting the ACK/NACK feedback information corresponding to the SPS PDSCH and the ACK/NACK feedback information corresponding to the PDCCH in which the DL DAI value is equal to 1 on PUCCH format 1a/1b resource comprises:
  transmitting, by the terminal device, the bundled ACK/NACK feedback information on PUCCH format 1a/1b resource corresponding to the PDCCH in which the DL DAI value is equal to 1.

9. A terminal device, configured to transmit acknowledgement/negative acknowledgement (ACK/NACK) feedback information by using physical uplink control channel (PUCCH) format 3, comprising:
  a receiving module, configured to receive information sent by a base station;
  a processing module, configured to process received information using PUCCH format 1b with channel selection or ACK/NACK bundling when the receiving module only received a semi-persistent scheduling (SPS) physical downlink shared channel (PDSCH) and a physical downlink control channel (PDCCH) in which a downlink (DL) downlink assignment index (DAI) value is equal to 1 sent by the base station in a feedback window; and
  a transmitting module, configured to transmit ACK/NACK feedback information bundled by the processing module on PUCCH format 1a/1b resource.

10. The terminal device of claim 9, wherein the processing module is configured to:
  determine information to be transmitted by using an LTE-A ACK/NACK multiplexing transmission mapping table, and determine PUCCH resource for transmitting the information from among multiple PUCCH format 1a/1b resources;
  bundle ACK/NACK feedback information corresponding to codewords with the same index in the SPS PDSCH and the PDCCH in which the DL DAI value is equal to 1; or
  spatially bundle ACK/NACK feedback information corresponding to the SPS PDSCH and the PDCCH in which the DL DAI value is equal to 1.

11. The terminal device of claim 10, wherein the transmitting module is configured to:
  transmit the information on the PUCCH resource determined by the processing module when the processing module adopts the PUCCH format 1b with channel selection; or
  transmit bundled ACK/NACK feedback information to the base station on PUCCH format 1a/1b resource corresponding to the PDCCH in which the DL DAI value is equal to 1 when the processing module adopts the ACK/NACK bundling.

12. The terminal device of claim 10, wherein the processing module is configured to:
  adopt the LTE-A Rel-10 ACK/NACK multiplexing transmission mapping table with A=2 when the terminal device is configured with downlink single codeword transmission; or
  adopt the LTE-A Rel-10 ACK/NACK multiplexing transmission mapping table with A=3 when the terminal device is configured with downlink multi-codeword transmission.

13. The terminal device of claim 10, wherein the processing module is configured to:
  adopt the LTE-A Rel-10 ACK/NACK multiplexing transmission mapping table with A=2;
  generate 2-bit bundled ACK/NACK feedback information through spatial bundling when the terminal device is configured with downlink multi-codeword transmission.

14. A method for acknowledgement/negative acknowledgement (ACK/NACK) transmission, comprising:
  receiving, by a base station, ACK/NACK feedback information which has been processed through PUCCH format 1b with channel selection or ACK/NACK bundling and is fed back by a terminal device, which is configured to transmit ACK/NACK feedback information by using PUCCH format 3, on physical uplink control channel (PUCCH) format 1a/1b resource when the base station transmitted only a semi-persistent scheduling (SPS) physical downlink shared channel (PDSCH) and a physical downlink control channel (PDCCH) in which a downlink (DL) downlink assignment index (DAI) value is equal to 1 to the terminal device within feedback window.

15. The method of claim 14, the receiving by the base station ACK/NACK feedback information which has been processed through ACK/NACK bundling and is fed back by the terminal device on PUCCH format 1a/1b resource comprises:
  receiving, by the base station, the ACK/NACK feedback information via the PUCCH format 1a/1b resource corresponding to the PDCCH in which the DL DAI value is equal to 1 when the base station did not transmit a PDCCH in which a DL DAI is larger than 1 to the terminal device in the feedback window; and
  monitoring, by the base station, PUCCH format 3 resource specified by an ARI and receives the ACK/NACK feedback information which has been processed through ACK/NACK bundling and ACK/NACK feedback information corresponding to a PDCCH in which a DL DAI is larger than 1 via the PUCCH format 3 resource when the base station also transmitted the PDCCH in which the DL DAI is larger than 1 to the terminal device in the feedback window, and determining the PDCCH in which the DL DAI is larger than 1 is missed if feedback information is not detected.

16. The method of claim 15, further comprising: after determining by the base station the PDCCH in which the DL DAI is larger than 1 is missed,
  monitoring, by the base station, PUCCH resource corresponding to the last transmitted subframe between the subframe in which the SPS PDSCH is transmitted and the subframe in which the PDCCH in which the DL DAI value is equal to 1 is transmitted, and receives the ACK/NACK feedback information which was fed back by the terminal device and processed through ACK/NACK bundling via the PUCCH resource.

17. The method of claim 14, the receiving by the base station the ACK/NACK feedback information which was fed back by the terminal device and processed through ACK/NACK bundling on PUCCH format 1a/1b resource comprises:
  receiving the ACK/NACK feedback information which was fed back by the terminal device and processed through PUCCH format 1b with channel selection according to an LTE-A ACK/NACK multiplexing transmission mapping table on the PUCCH resource corresponding to the SPS PDSCH and the PDCCH in which the DL DAI value is equal to 1 sent to the terminal device when the base station did not transmit a PDCCH in which a DL DAI is larger than 1 to the terminal device in the feedback window; and
  monitoring, by the base station, PUCCH format 3 resource specified by an ARI and receiving ACK/NACK feedback information corresponding to a PDCCH in which a DL DAI is larger than 1 via the PUCCH format 3 resource when the base station also transmitted the PDCCH in which the DL DAI is larger than 1 to the terminal device in the feedback window, determining the PDCCH in which the DL DAI is larger than 1 is missed if feedback information is not detected.

18. The method of claim 17, further comprising:
  receiving the ACK/NACK feedback information which was fed back by the terminal device and processed through PUCCH format 1b with channel selection via PUCCH resource corresponding to the SPS PDSCH and the PDCCH in which the DL DAI value is equal to 1 sent to the terminal device according to an LTE-A ACK/NACK multiplexing transmission mapping table in response to a determination that the PDCCH in which a DL DAI is larger than 1 is missed.

19. The method of claim 17, wherein the LTE-A ACK/NACK multiplexing transmission mapping table comprises:
  the LTE-A Rel-10 ACK/NACK multiplexing transmission mapping table with A=2;
  wherein parameters in the mapping table comprises:
  hybrid automatic repeat request (HARQ)-ACK(0) which is ACK/NACK feedback information corresponding to the SPS PDSCH;
  HARQ-ACK(1) which is ACK/NACK feedback information corresponding to the PDCCH in which a DL DAI value is equal to 1;

$$n^{(1)}_{PUCCH,0}, \tilde{n}^{(1)}_{PUCCH,0}$$

which is SPS PUCCH format 1a/1b resource for the SPS PDSCH; and $$n^{(1)}_{PUCCH,1}, \tilde{n}^{(1)}_{PUCCH,1}$$

which is PUCCH format 1a/1b resource determined according to $n_{CCE}$, $n_{CCE}$ is the index of the first CCE occupied by the PDCCH in which the DL DAI value is equal to 1.

20. The method of claim 17, wherein the LTE-A ACK/NACK multiplexing transmission mapping table comprises:
  the LTE-A Rel-10 ACK/NACK multiplexing transmission mapping table with A=2 when the terminal device is configured with downlink single codeword transmission;
  the LTE-A Rel-10 ACK/NACK multiplexing transmission mapping table with A=3 when the terminal device is configured with downlink multi-codeword transmission;
  wherein parameters in the mapping table comprises:
  hybrid automatic repeat request (HARQ)-ACK(0) which is ACK/NACK feedback information corresponding to the SPS PDSCH;
  HARQ-ACK(1) which is ACK/NACK feedback information corresponding to codeword 1 of the PDCCH in which the DL DAI value is equal to 1;
  HARQ-ACK(2) which is ACK/NACK feedback information corresponding to codeword 2 of the PDCCH in which the DL DAI value is equal to 1;

$$n^{(1)}_{PUCCH,0}, \tilde{n}^{(1)}_{PUCCH,0}$$

which is SPS PUCCH format 1a/1b resource for the SPS PDSCH;

$$n^{(1)}_{PUCCH,1}, \tilde{n}^{(1)}_{PUCCH,1}$$

which is PUCCH format 1a/1b resource determined according to $n_{CCE}$, $n_{CCE}$ is the index of the first CCE occupied by the PDCCH in which the DL DAI value is equal to 1; and $$n^{(1)}_{PUCCH,2}$$

which is PUCCH format 1a/1b resource obtained by using $n_{CCE}+1$.

* * * * *